March 31, 1970 N. G. HAYWARD 3,503,191
COTTON PICKING SPINDLE
Filed Sept. 29, 1967
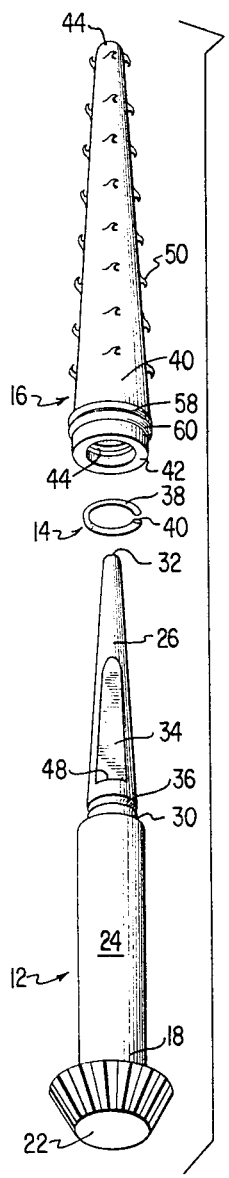
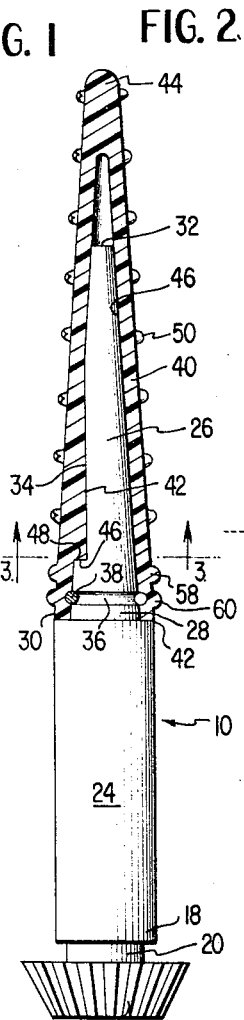
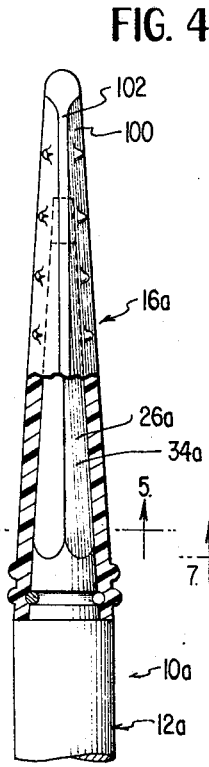
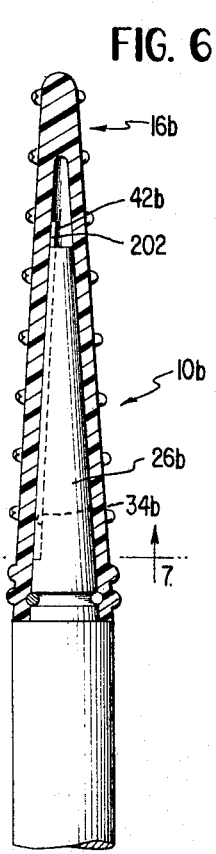
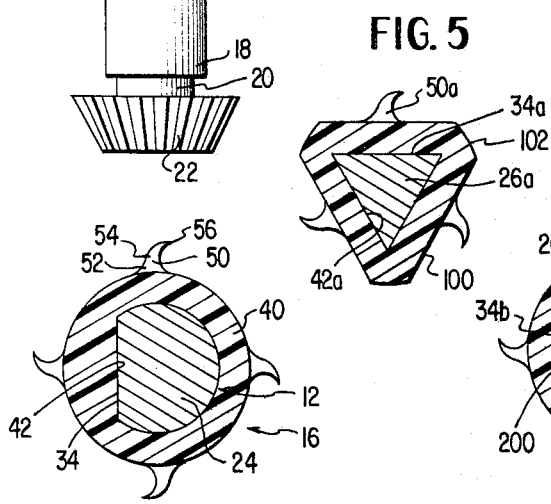
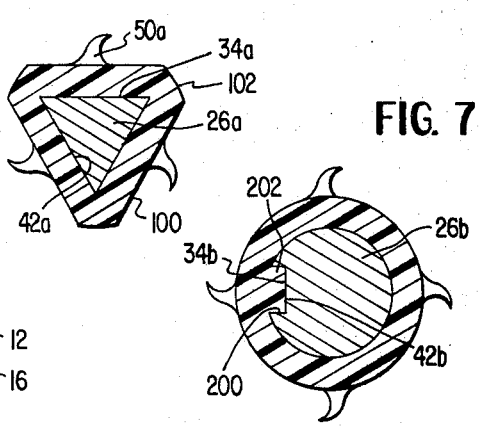
INVENTOR
NORMAN G. HAYWARD
BY *Robert G. McMorrow*
ATTORNEY

United States Patent Office 3,503,191
Patented Mar. 31, 1970

3,503,191
COTTON PICKING SPINDLE
Norman G. Hayward, Rte. 2, Box 119-G,
Manassas, Va. 22110
Filed Sept. 29, 1967, Ser. No. 671,781
Int. Cl. A01d 45/20
U.S. Cl. 56—50                                              6 Claims

ABSTRACT OF THE DISCLOSURE

A spindle for cotton picking machinery, the spindle comprising a metallic base with an outward portion, and a plastic sleeve for said outward portion, the sleeve having means for releasable engagement with the portion and having teeth therein.

BACKGROUND OF THE INVENTION

Field of the invention

Cotton picking machinery in widespread use comprises a gearing system with one or more spindle element operatively engaged therewith for rotation by the gearing system. The spindles have projecting teeth which, on rotation against the cotton plant, interengage with the plant fibers and pick the cotton.

Description of the prior art

Generally, the aforesaid spindles are of one piece, integral construction. Difficulties and expense incurred where the spindles are so constructed, occasioned by wear and relative short life of the teeth, have prompted prior attempts to provide removable or replaceable spindle portions at the areas of maximum wear. Exemplary of prior patents on this subject are the following U.S. patents:

Call, 2,787,110, Apr. 2, 1957; Oshatz, 2,929,189; Mr. 22, 1960; Baker, 2,440,767, May 4, 1948; Todd, 423,885, Mar. 18, 1890; Haring, 2,975,580, Mar. 21, 1961.

SUMMARY OF THE INVENTION

The present invention provides a new and novel spindle assembly wherein that portion of the assembly which is subjected to maxmium wear is adapted for non-complex replacement. A basic objective of the invention therefore is to provide a spindle assembly of the character indicated above wherein the working portion is replaceable, and wherein such replacement does not involve dis-assembly or access to the drive components of the machine.

A related objective resides in the provision of a replaceable spindle portion engaged with the main spindle by frictional engagement and by contact of non-circular portions of each, thereby preventing relative rotation of the elements. The spindle element hereof includes a metallic portion for contact with the prime mover guide mechanism, and a non-metallic portion, molded of plastic, or the like, as a replaceable work contact element.

Still another important object resides in the construction of a spindle work portion of plastic or like material, and the incorporation of specially shaped, flexible barbs or teeth which engage the cotton by hooking action to avoid gathering of anything other than the cotton from a ripe boll. Further, the hooking action of the bars eliminates the need which heretofore existed to apply water to the spindles during operation, thereby speeding and improving the harvesting procedure. In addition, the hooking action does not require extreme sharpness in order to be effective, and therefore, the usable life of the replaceable portion of the spindle is appreciably lengthened.

The present invention has as a further objective thereof the provision of means to reduce the possibility of moisture on the spindle from finding its way into the machine, and coactive means precluding the transfer of machinery lubricant to the spindle whereat it would soil or damage the cotton.

The invention comprehends the inclusion of novel snap ring attachment means which engage the replaceable spindle portion.

Other and further objects and advantages of the invention will become apparent to those skilled in the art from a consideration of the following specification when read in conjunction with the annexed drawing.

BRIEF DESCRIPTION OF THE DRAWING

FIGURE 1 is a dis-assembled perspective view of a spindle assembly constructed in accordance with the teachings of this invention;

FIGURE 2 is an elevational view, partially in cross section, of the elements of FIGURE 1 in an assembled condition;

FIGURE 3 is an enlarged, detail view substantially on the section line 3—3 of FIGURE 2, looking in the direction of the arrows;

FIGURE 4 is a view similar to FIGURE 2, showing a modification;

FIGURE 5 is a sectional view showing details taken substantially on the line 5—5 of FIGURE 4, looking in the direction of the arrows;

FIGURE 6 is another view similar to FIGURE 2, showing another modified form of the invention; and FIGURE 7 is a detail, sectional view taken on line 7—7 of FIGURE 6, looking in the direction of the arrows.

DESCRIPTION OF THE PREFERRED EMBODIMENTS

Referring initially to FIGURES 1 through 3 of the drawing, a first form of the invention is there shown and is generally designated by reference numeral 10. Basically, three components are included in the assembly 10: a main spindle 12, a retaining ring 14, and a replaceable sleeve 16.

The spindle 12 is of metallic construction and may be manufactured in the particular form dictated by the present invention initially, or may be remanufactured from existing spindles. The main spindle includes an inboard end portion 18 having a reduced neck 20 which carries a bevel gear 22. The gear 22 is normally in operative engagement with a gear system (not shown) of cotton picking machinery, which is effective to rotate the main spindle. Outboard of the gear 22, the spindle has a substantially cylindrical central section 24, which is integral with a tapered outboard section 26. The section 26 has an enlarged base end 28 contacting the section 24 at a shoulder 30, and a truncated outer end 32 of reduced diameter. A longitudinal flat face 34 is formed on the section 26 and is substantially parallel to the longitudinal axis of the main spindle. The section 26 further has an annular groove 36 formed therein adjacent its base 28, for a purpose described below.

The retaining ring 14 is preferably of metallic construction and comprises an annular body portion 38 split at 40 whereby it possesses a degree of limited flexibility. The ring is adapted to seat in the groove 36 of the spindle section 26 and is dimensioned to fit closely therein.

The replaceable sleeve 16 is preferably formed of a hard plastic substance such as structural nylon, or the like, and is of elongated, substantially hollow form. The sleeve has a body portion 40 with an inner end 42 and an outer end 44, and has a bore 46 formed therein and opening on the end 42. The bore 46 is shaped and dimensioned such that the sleeve fits closely over the portion 26 of the spindle. As shown in FIGURES 2 and 3, the inside wall of the sleeve defining the bore has a flat section 42 which bears against the face 34 of the spindle. By virtue of the contact of the flat face and section, interrupting the generally circular form of the bore and spindle section, relative rotation between these elements is prevented.

The sleeve has an internal groove 44 formed therein adjacent its end 42 which is coaligned with the groove 36 and snap ring 14 upon correct assembly of the elements. The ring seats in the groove 44, and the groove 26, to thereby provide a releasable connection means for the sleeves. It will be observed that the sleeve and spindle have shoulders, at 46, 48, which meet at a location setting the correct inward dwell of the sleeve on the spindle to position the ring within said groove.

The sleeve has a plurality of teeth 50 thereon arranged in longitudinally extending rows. The teeth are specially formed to result in a hooking action to withdraw the cotton from the boll, and are somewhat flexible due to the construction of the sleeve from plastic. Each tooth or barb comprises an enlarged base 52 integral with the sleeve which tapers to a cupped body portion 54 terminating in a hook portion 56 bent forwardly in the direction of rotation of the spindle.

The sleeve 16 has two, annular outwardly extending protector rings 58, 60 thereon adjacent its inner end 42. The invention thereby provides a means for blocking the passage of water from the sleeve to the machine, and prevention of drainage of lubricant from the machine drive from finding its way to the working portion of the sprindle and thereby soiling or otherwise contaminating the fibers.

FIGURES 4 and 5 disclose a first modified form of the invention, designated 10a. Here, the outboard portion 26a of the main spindle 12a has three flat faces 34a mating with a like number of flat sections 42a of the sleeve 16a. The sleeve has flat outer faces 100 arranged substantialy parallel to its flat inner faces 42a with rounded edge portions 102 intermediate the outer faces. The teeth 50 are provided on the flat outer faces.

A further modification is seen in FIGURES 6 and 7. Here, the assembly 10b includes a spindle outboard section 26b with a longitudinal slot 200 therein, providing a flat face 34b in recessed form. The sleeve 16b has an inward, longitudinal projection 202, with a flat outer section 42b, and the projection is positioned within the slot 200 in the manner shown.

The operation of this invention insofar as contact with the material to be harvested is concerned is the same as with a conventional spindle assembly. However, the above described hooking action of the barbs 50, 50a, 50b, with respect to the fibers is effective in selectively withdrawing cotton from the boll, leaving behind undesired foreign material. Spindle life is measurably increased by virtue of the resiliency of the barbs, and by the particular action employed in the operation thereof.

Should a spindle require replacement however, it is merely necessary to force the sleeve 16, 16a, or 16b off the main spindle associated therewith, and to thereafter replace it with another spindle.

I claim:

1. A spindle for a cotton picking machine the machine having spindle drive gear means, the spindle comprising a main spindle having an inboard end portion with a gear thereon drivingly engaged with the drive gear means of the machine; the main spindle having a substantially cylindrical central section and having an outboard section of tapered construction with an enlarged base contacting the central section and being tapered to a reduced outer end; the outboard section being generally rounded in section, and having at least one flat face thereon; the outboard section having an annular groove therein adjacent the base thereof; annular ring means seated in the groove; a spindle sleeve constructed of plastic material and having inner and outer ends; the sleeve having a bore therein opening on its inner end, the bore being of a configuration and dimension to frictionally engage the outboard section of the main spindle and including a flat section engaging the flat face of the outboard section; said outboard section of said main spindle being of reduced diameter to form a shoulder with said central section such that the inner end of such sleeve lies flush with said central section of said main spindle; the sleeve having an interior, annular sleeve groove therein opening on the bore adjacent the inner end of the sleeve; the ring means being engaged in the sleeve groove; the sleeve having an outer surface tapered from end to end such that the sleeve is enlarged at its inner end and of gradually reduced diameter to its outer end; a plurality of teeth, arranged in longitudinally extending rows, on the outer surface of the sleeve; and annular outwardly extending protective ring means on the sleeve to prevent passage of water from the sleeve to the machine and to prevent passage of lubricants from the machine to the sleeve.

2. The invention of claim 1, wherein:
the teeth each comprise a base, a cupped body portion, and a forward hook portion.

3. The invention of claim 1, wherein:
the protective ring means comprises two spaced apart rings.

4. The invention of claim 1, wherein:
the teeth each comprise a base, a cupped body portion and a forward hook portion; and
the protective ring means comprises two spaced apart rings.

5. The invention of claim 4, wherein:
the outboard section of the main spindle has three flat faces forming a substantially equilateral triangle in cross section; and
the bore of the sleeve being shaped to engage said flat faces.

6. The invention of claim 4, wherein:
the flat face of the outboard section is recessed; and
the sleeve has an inward projection extending into said recess to contact the flat face.

References Cited

UNITED STATES PATENTS

| | | | |
|---|---|---|---|
| 311,344 | 1/1885 | Mason | 56—50 |
| 1,636,132 | 7/1927 | Hoofnagle | 56—50 XR |
| 2,440,767 | 5/1948 | Baker | 56—50 |
| 2,504,723 | 4/1950 | Paradise | 56—50 |
| 2,667,725 | 2/1954 | Voigt | 56—50 |
| 2,787,110 | 4/1957 | Call | 56—50 |
| 2,837,886 | 6/1958 | Beach et al. | 56—42 |
| 2,929,189 | 3/1960 | Oshatz et al. | 56—50 |
| 2,975,580 | 3/1961 | Haring | 56—50 |

LOUIS G. MANCENE, Primary Examiner

JAMES A. OLIFF, Assistant Examiner